(12) United States Patent
Kurokawa

(10) Patent No.: US 12,728,927 B2
(45) Date of Patent: Sep. 8, 2026

(54) FRONT PILLAR STRUCTURE

(71) Applicant: TOYOTA JIDOSHA KABUSHIKI KAISHA, Toyota (JP)

(72) Inventor: Daisuke Kurokawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 18/516,789

(22) Filed: Nov. 21, 2023

(65) Prior Publication Data

US 2024/0239413 A1 Jul. 18, 2024

(30) Foreign Application Priority Data

Jan. 13, 2023 (JP) ................................ 2023-004084

(51) Int. Cl.
*B62D 25/04* (2006.01)
*B62D 25/00* (2006.01)

(52) U.S. Cl.
CPC ............ *B62D 25/04* (2013.01); *B62D 25/00* (2013.01)

(58) Field of Classification Search
CPC ................................ B62D 25/04; B62D 25/00
See application file for complete search history.

(56) References Cited

U.S. PATENT DOCUMENTS 4,886,314 A * 12/1989 Maeda ................ B62D 25/081 296/192
2001/0005092 A1* 6/2001 Sakyo .................. B62D 21/09 296/203.02
2010/0194147 A1* 8/2010 Aul ........................ B62D 25/04 296/193.06
2010/0225141 A1* 9/2010 Mori ...................... B60J 5/0437 296/146.6
2012/0313400 A1* 12/2012 Balzer .................... B62D 25/04 296/193.06
2018/0043938 A1* 2/2018 Tsuneyama .......... B62D 21/152
2018/0265134 A1 9/2018 Tomiki

FOREIGN PATENT DOCUMENTS

JP 2012-197018 A 10/2012
JP 2016-187971 A 11/2016
JP 2018-024319 A 2/2018
JP 2019-034601 A 3/2019
JP 6624131 B2 12/2019
KR 100263964 B1 * 8/2000 ............ B62D 25/04

* cited by examiner

*Primary Examiner* — Daniel J Colilla
(74) *Attorney, Agent, or Firm* — SOLARIS Intellectual Property Group, PLLC

(57) ABSTRACT

A front pillar structure, includes: a front pillar outer panel having an outer flange part at a vehicle forward side and a vehicle rearward side; a front pillar inner panel having an inner flange part joined to the outer flange part at each of the vehicle forward side and the vehicle rearward side; an outer bulkhead joined to the front pillar outer panel so as to configure a closed cross-sectional shape with the front pillar outer panel; an inner bulkhead that is joined to the front pillar inner panel so as to configure a closed cross-sectional shape with the front pillar inner panel, and that is disposed at a vehicle rearward side of the outer bulkhead, so as to overlap with the outer bulkhead in a vehicle width direction; and a cowl top side panel disposed at a vehicle forward side of the front pillar outer panel.

1 Claim, 6 Drawing Sheets

11
18
36A
10
26A
12
26
38C
17
36
16B
38E
38A
38B
16
38
22
28E
38D
32
28C
28A
30
20
28D
24
28
16A
34
34A
24A
28B
14A
14
RH
FR 11
18
36A
10
26A
12
26
38C
36
17
16B
38E
38
22
28E
38B
16
38A
38D
32
28C
30
28A
20
16A
34
28
24
14A
28D
34A
24A
28B
14
RH
FR 11
18
36A
26A
38C
36
17
10
16B
26
12
38E
38
22
38B
38A
16
28E
38D
32
28A
28C
30
20
16A
34
28
24
14A
28D
28B
34A
24A
14
RH
FR 11
18
36A
26A
38C
36
17
10
26
12
16B
38E
16
38
38B
38A
28E
38D
32
16A
30
28A
28C
22
20
34
28
24
28B
28D
14A
34A
24A
14
RH
FR

FRONT PILLAR STRUCTURE

CROSS-REFERENCE TO RELATED APPLICATION

This application is based on and claims priority under 35 USC 119 from Japanese Patent Application No. 2023-004084, filed on Jan. 13, 2023, the disclosure of which is incorporated by reference herein.

BACKGROUND

Technical Field

The present disclosure relates to a front pillar structure.

Related Art

Vehicle front part structures for suppressing retraction of a front pillar at the time of a small overlap collision are conventionally known (see, for example, Japanese Patent Application Laid-Open (JP-A) No. 2019-034601). In this vehicle front part structure, a bulkhead and a cowl top side panel disposed within the closed section of the front pillar are directly joined together, and a cowl top panel, a cowl top side panel, a bulkhead (front pillar), and a door belt line reinforcement are arranged in a straight line in side view. This enables the collision load to be transmitted to the vehicle rearward side of the front pillar during a small overlap collision.

However, during front collisions, including small overlap collisions, of a vehicle, owing to deformation of the front pillar outer panel in conjunction with retraction of the cowl top side panel in plan view, there is a risk of the joint portion between the outer flange part of the front pillar outer panel at the vehicle rearward side and the inner flange part of the front pillar inner panel at the vehicle rearward side becoming separated (the spot weld part being broken). Thus, there is still room for improvement in the structure that suppresses separation of the joint portion between the outer flange part and the inner flange part at the vehicle rearward side.

SUMMARY

The present disclosure provides a front pillar structure capable of suppressing separation of a joint portion between an outer flange part of a front pillar outer panel at a vehicle rearward side and an inner flange part of a front pillar inner panel at a vehicle rearward side at the time of a front collision of the vehicle.

A front pillar structure of a first aspect according to the present disclosure includes: a front pillar outer panel having an outer flange part at a vehicle forward side and a vehicle rearward side; a front pillar inner panel having an inner flange part joined to the outer flange part at each of the vehicle forward side and the vehicle rearward side; an outer bulkhead joined to the front pillar outer panel so as to configure a closed cross-sectional shape with the front pillar outer panel, and disposed between the front pillar outer panel and the front pillar inner panel; an inner bulkhead that is joined to the front pillar inner panel so as to configure a closed cross-sectional shape with the front pillar inner panel, and that is disposed between the front pillar outer panel and the front pillar inner panel, and at a vehicle rearward side of the outer bulkhead, so as to overlap with the outer bulkhead in a vehicle width direction; and a cowl top side panel disposed at a vehicle forward side of the front pillar outer panel.

According to the first aspect, the outer flange part of the front pillar outer panel at the vehicle forward side and the inner flange part of the front pillar inner panel at the vehicle forward side are joined together, and the outer flange part of the front pillar outer panel at the vehicle rearward side and the inner flange part of the front pillar inner panel at the vehicle rearward side are joined together. Further, an outer bulkhead joined to the front pillar outer panel is disposed between the front pillar outer panel and the front pillar inner panel so as to configure a closed cross-sectional shape with the front pillar outer panel, and an inner bulkhead joined to the front pillar inner panel is disposed between the front pillar outer panel and the front pillar inner panel and at a vehicle rearward side of the outer bulkhead so as to overlap with the outer bulkhead in a vehicle width direction so as to configure a closed cross-sectional shape with the front pillar inner panel. Moreover, a cowl top side panel is disposed at a vehicle forward side of the front pillar outer panel.

Accordingly, during a front collision of a vehicle, while the collision load input to the cowl top side panel is transmitted from the cowl top side panel to the front pillar outer panel, the collision load is transmitted from the front pillar outer panel to the outer bulkhead. The collision load transmitted to the outer bulkhead is transmitted to the inner bulkhead, and by plastic deformation of the outer bulkhead and the inner bulkhead, at least a part of the collision load is absorbed. As a result, the load input to the joint part between the outer flange part and the inner flange part at the vehicle rearward side is reduced, and separation of the joint part is suppressed.

A front pillar structure of a second aspect according to the present disclosure is the front pillar structure of the first aspect, in which the outer bulkhead configures a closed cross-sectional shape with the front pillar outer panel in plan view, and the inner bulkhead configures a closed cross-sectional shape with the front pillar inner panel in plan view.

According to the second aspect, the outer bulkhead and the front pillar outer panel form a closed cross-sectional shape in plan view, and the inner bulkhead and the front pillar inner panel configure a closed cross-sectional shape in a plan view. Namely, the outer bulkhead and the inner bulkhead are each open in the vertical direction of the vehicle. Accordingly, both the outer bulkhead and the inner bulkhead, compared to a case in which, for example, a closed cross-sectional shape is configured in a front view along the front-rear direction of the vehicle, are easily plastically deformed in the front-rear direction of the vehicle and easily absorb a collision load. As a result, the load input to the joint part between the outer flange part and the inner flange part at the rear side of the vehicle is efficiently reduced, and separation of the joint part is suppressed more effectively.

As described above, according to the present disclosure, it is possible to suppress separation of the joint part between the outer flange part of the front pillar outer panel at the vehicle rearward side and the inner flange part of the front pillar inner panel at the vehicle rearward side during a vehicle front collision.

BRIEF DESCRIPTION OF THE DRAWINGS

Exemplary embodiments of the present disclosure will be described in detail based on the following figures, wherein.

DETAILED DESCRIPTION

In the following, embodiments according to the present disclosure are explained in detail based on the drawings. Note that for simplicity of explanation, the arrow UP, arrow FR, and arrow RH shown in the respective drawings indicate upward, forward, and rightward of the vehicle, respectively. Accordingly, in the following explanation, unless otherwise noted, in cases in which the up-down, front-rear, and left-right directions are described, the up-down, front-rear, left-right directions in a vehicle are indicated. The left-right direction is synonymous with the vehicle width direction.

Figure 1:
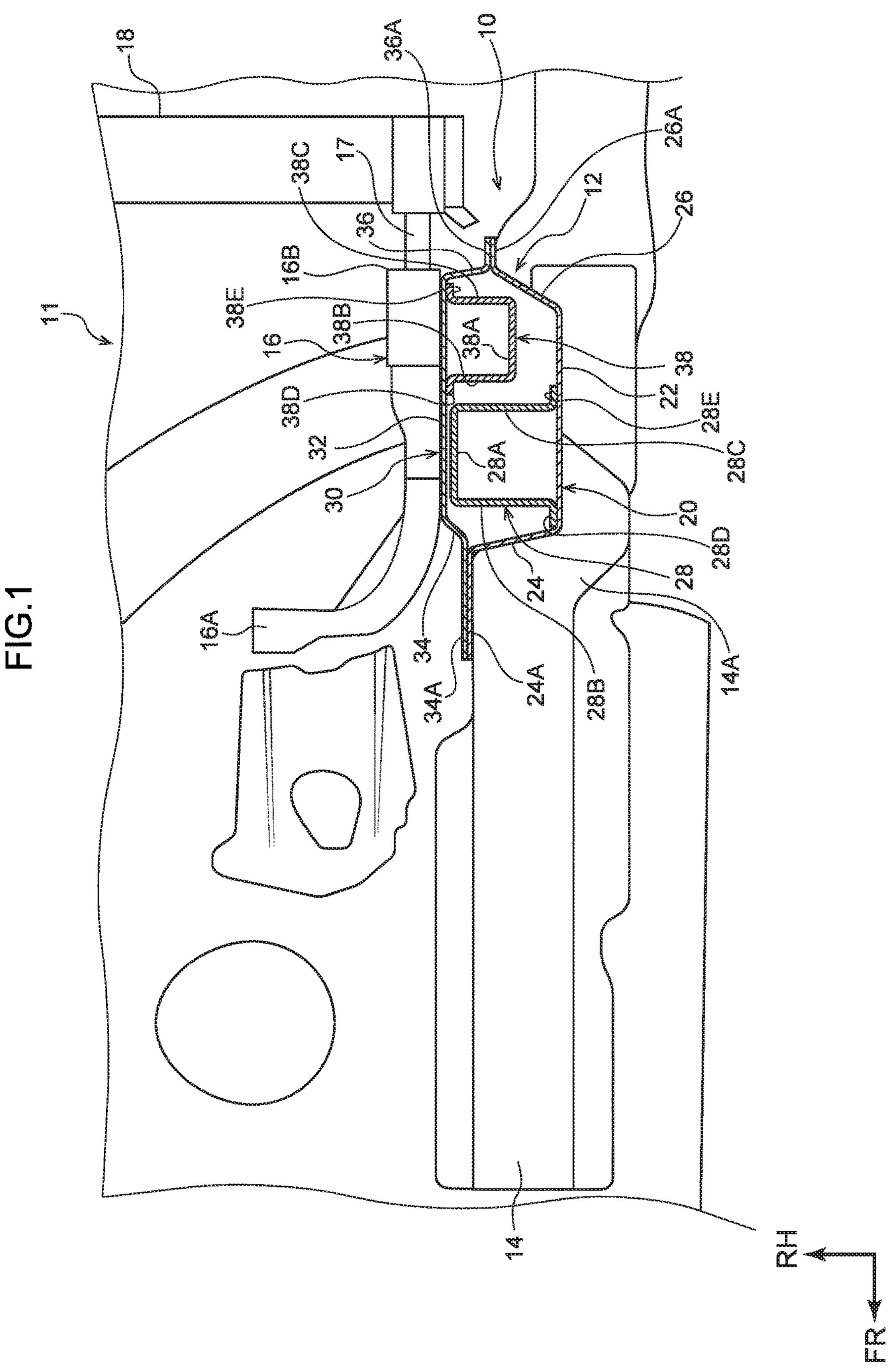
FIG. 1 is a schematic plan view illustrating a front pillar structure according to the present exemplary embodiment.

As illustrated in FIG. 1, a front pillar 12 of a vehicle 11, such as an electric vehicle to which the front pillar structure 10 according to the present exemplary embodiment is applied, is configured in a closed cross-sectional shape by a front pillar outer panel 20 and a front pillar inner panel 30. Namely, the front pillar 12 is formed in a hollow columnar shape and extends in a vertical direction.

The front pillar outer panel 20 includes an outer wall part 22 configuring a vertical wall at an outer side of the front pillar 12 in the vehicle width direction. The outer wall part 22 extends along a vertical direction with the vehicle width direction serving as a plate thickness direction. The front pillar outer panel 20 includes a front vertical wall part 24 that is bent and extended inward in the vehicle width direction from a front end part of the outer wall part 22, and a rear vertical wall part 26 that is bent and extended inward in the vehicle width direction from a rear end part of the outer wall part 22. The front vertical wall part 24 and the rear vertical wall part 26 each extend along a vertical direction with a substantially front-rear direction serving as a plate thickness direction.

Moreover, the front pillar outer panel 20 includes a forward outer flange part 24A that is bent and extended forward from an inner end of the front vertical wall part 24 in the vehicle width direction, and a rearward outer flange part 26A that is bent and extended rearward from an inner end of the rear vertical wall part 26 in the vehicle width direction. The forward outer flange part 24A and the rearward outer flange part 26A respectively extend along the vertical direction with the vehicle width direction serving as a plate thickness direction. Namely, the front pillar outer panel 20 is formed in a generally hat-shaped shape with an opening directed inward in the vehicle width direction in a plan cross-sectional view.

The front pillar inner panel 30 includes an inner wall part 32 configuring a vertical wall at an inner side of the front pillar 12 in the vehicle width direction. The inner wall part 32 extends along the vertical direction with the vehicle width direction serving as the plate thickness direction. Moreover, the front pillar inner panel 30 includes a front vertical wall part 34 that is bent and extended outward in the vehicle width direction from a front end part of the inner wall part 32, and a rear vertical wall part 36 that is bent and extended outward in the vehicle width direction from a rear end part of the inner wall part 32. The front vertical wall part 34 and the rear vertical wall part 36 each extend along the vertical direction with a substantially front-rear direction serving as a plate thickness direction.

Moreover, the front pillar inner panel 30 includes a forward inner flange part 34A that is bent and extended forward from an outer end of the forward vertical wall part 34 in the vehicle width direction, and a rearward inner flange part 36A that is bent and extended rearward from an outer end of the rear vertical wall part 36 in the vehicle width direction. The forward inner flange part 34A and the rearward inner flange part 36A respectively extend along the vertical direction with the vehicle width direction serving as a plate thickness direction. Namely, the front pillar inner panel 30 is formed in a generally hat-shaped shape with an opening directed outward in the vehicle width direction in a plan cross-sectional view.

The forward outer flange part 24A of the front pillar outer panel 20 and the forward inner flange part 34A of the front pillar inner panel 30 are joined together by plural spot welds arranged in the vertical direction, and the rearward outer flange part 26A of the front pillar outer panel 20 and the rearward inner flange part 36A of the front pillar inner panel 30 are joined together by plural spot welds arranged in the vertical direction. The front pillar 12 having a closed cross-sectional shape extending along the vertical direction is thus configured.

Figure 5A:
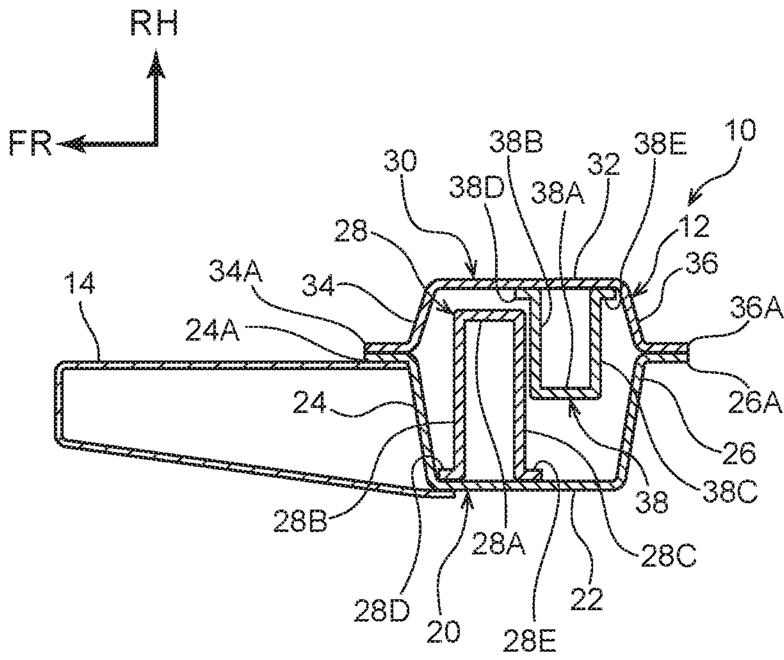
FIG. 5A is a schematic plan view schematically illustrating the front pillar structure according to the present exemplary embodiment.

As illustrated in FIG. 1 and FIG. 5A, inside the front pillar 12 (between the front pillar outer panel 20 and the front pillar inner panel 30), an outer bulkhead 28 that forms a closed cross-sectional shape with the front pillar outer panel 20 in plan view, and an inner bulkhead 38 that forms a closed cross-sectional shape with the front pillar inner panel 30 in plan view, are disposed.

The outer bulkhead 28 is formed with a generally hat-shaped cross section that opens outward in the vehicle width direction in plan view, and protrudes towards the side of the inner wall part 32 of the front pillar inner panel 30. More specifically, the outer bulkhead 28 is provided with a flat plate-shaped vertical wall part 28A at a position inward in the vehicle width direction, and the vertical wall part 28A extends along the vertical direction with the vehicle width direction serving as the plate thickness direction. The vertical wall part 28A is disposed close to the inner wall part 32 (at a slight interval).

The front part of the outer bulkhead 28 is a front wall part 28B that is extended from a front end part of the vertical wall part 28A toward the outer side in the vehicle width direction by being bent at a substantially right angle, and this front wall part 28B extends along the vertical direction with the front-rear direction serving as a plate thickness direction. The rear part of the outer bulkhead 28 is a rear wall part 28C that is extended from a rear end part of the vertical wall part 28A toward the outer side in the vehicle width direction by being bent at a substantially right angle, and this rear wall part 28C extends along the vertical direction with the front-rear direction serving as a plate thickness direction.

Moreover, a front flange part 28D is extended from an outer end part of the front wall part 28B in the vehicle width direction by being bent forward at a substantially right angle, and a rear flange part 28E is extended from an outer end of the rear wall part 28C in the vehicle width direction by being bent rearward at a substantially right angle. The front flange part 28D and the rear flange part 28E extend in the vertical direction with the vehicle width direction serving as the plate thickness direction.

The front flange part 28D and the rear flange part 28E are joined to the outer wall part 22 of the front pillar outer panel 20 by spot welding. This enables the outer bulkhead 28 and the outer wall 22 of the front pillar outer panel 20 to configure a closed cross-sectional shape that opens in a vertical direction.

The inner bulkhead 38 is formed in a generally hat-shaped cross section that opens inward in the vehicle width direction in plan view, and protrudes toward the outer wall part 22 side of the front pillar outer panel 20. More specifically, the inner bulkhead 38 is provided with a flat plate-shaped vertical wall part 38A at a position at an outer side in the vehicle width direction, and the vertical wall part 38A extends in the vertical direction with the vehicle width direction serving as the plate thickness direction. Note that the vertical wall part 38A is disposed at a predetermined interval with respect to the outer wall part 22.

The front part of the inner bulkhead 38 is a front wall part 38B that is extended from the front end of the vertical wall part 38A toward the inner side in the vehicle width direction by being bent at a substantially right angle, and the front wall part 38B extends along a vertical direction with the front-rear direction serving as a plate thickness direction. The rear part of the inner bulkhead 38 is a rear wall part 38C that is extended from the rear end of the vertical wall part 38A toward the inner side in the vehicle width direction by being bent at a substantially right angle, and the rear wall part 38C extends along a vertical direction with the front-rear direction serving as a plate thickness direction.

Moreover, a front flange part 38D is extended from an inner side end of the front wall part 38B in the vehicle width direction by being bent forward at a substantially right angle, and a rear flange part 38E is extended from an inner side end of the rear wall part 38C in the vehicle width direction by being bent rearward at a substantially right angle. The front flange part 38D and the rear flange part 38E extend in the vertical direction with the vehicle width direction serving as the plate thickness direction.

The front flange part 38D and the rear flange part 38E are joined to the inner wall part 32 of the front pillar inner panel 30 by spot welding. This enables the inner bulkhead 38 and the inner wall part 32 of the front pillar inner panel 30 to configure a closed cross-sectional shape that opens in a vertical direction.

The inner bulkhead 38 is disposed rearward of the outer bulkhead 28 so as to overlap with the outer bulkhead 28 in the vehicle width direction. In other words, the outer bulkhead 28 is disposed at a front side of the inner bulkhead 38 so as to overlap with at least a portion of the inner bulkhead 38 in a front view.

Note that the outer bulkhead 28 and the inner bulkhead 38 are disposed at a predetermined interval in the front-rear direction. This interval is set from the viewpoints of prevention of abnormal noise being generated owing to the outer bulkhead 28 and the inner bulkhead 38 being in contact with each other during normal driving of the vehicle 11, and of ease of assembly of the outer bulkhead 28 with the outer wall part 22 and ease of assembly of the inner bulkhead 38 and the inner wall part 32.

A cowl top side panel 14 is provided at a front side of the front pillar outer panel 20. Namely, a rear end part 14A of the cowl top side panel 14 is coupled to the forward outer flange part 24A, the front vertical wall part 24, and the front part of the outer wall part 22 of the front pillar outer panel 20. As an example, the outer bulkhead 28 and the inner bulkhead 38 are disposed rearward of the cowl top side panel 14 and forward of a belt line reinforcement (not illustrated).

A front pillar inner gusset 16 is attached to an inner side in the vehicle width direction of the inner wall part 32 of the front pillar inner panel 30. A dash cross member (not illustrated) is attached to a front part 16A of the front pillar inner gusset 16, and an end part of an instrument panel reinforcement 18 is attached to a rear part 16B of the front pillar inner gusset 16 via a bracket 17. The instrument panel reinforcement 18 is a pipe-shaped member spanning the vehicle width direction.

Next, explanation follows regarding the mechanism of the front pillar structure 10 according to the present exemplary embodiment configured as described above.

Figure 6A:
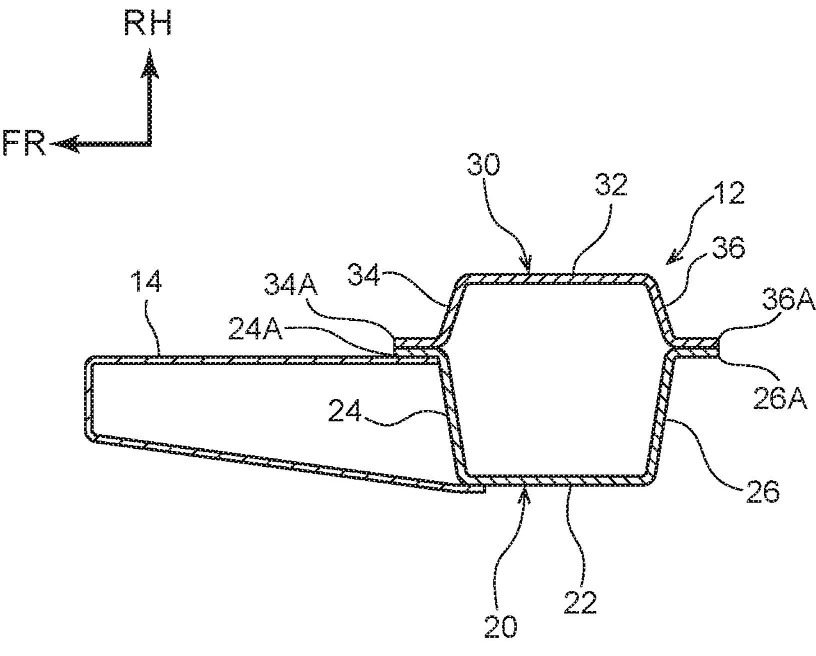
FIG. 6A is a schematic plan view schematically illustrating the front pillar structure according to a comparative example.
Figure 6B:
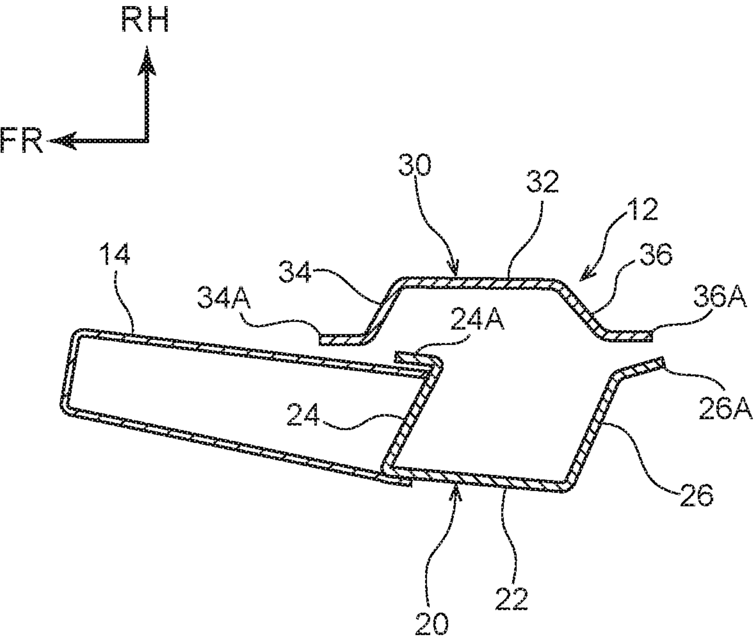
FIG. 6B is a schematic plan view schematically illustrating a state of the front pillar structure according to the comparative example at a later stage of a collision.

First, explanation follows regarding cases in which a vehicle including a front pillar configuration according to a comparative example illustrated in FIG. 6A and FIG. 6B is involved in a front collision. As illustrated in FIG. 6A, in the front pillar configuration of the comparative example, the outer bulkhead 28 and the inner bulkhead 38 are not provided inside the front pillar 12.

When a vehicle including a front pillar structure according to the comparative example is involved in a front collision, a collision load is input to the cowl top side panel 14 from a front side. As illustrated in FIG. 6B, the front end of the cowl top side panel 14 is displaced inward in the vehicle width direction, and the rear end of the cowl top side panel 14 is displaced rearward and outward in the vehicle width direction, as the collision load is input to the front pillar 12.

As described above, the outer bulkhead 28 and the inner bulkhead 38 are not provided inside the front pillar 12. Accordingly, when the collision load input to the cowl top side panel 14 is transmitted from the cowl top side panel 14 to the front pillar outer panel 20, the front vertical wall part 24 of the front pillar outer panel 20 is plastically deformed rearward and outward in the vehicle width direction, and the outer wall part 22 of the front pillar outer panel 20 is displaced rearward and outward in the vehicle width direction.

As a result, a load is applied to the rearward outer flange part 26A of the front pillar outer panel 20 in a direction away from the rearward inner flange part 36A of the front pillar inner panel 30, and the outer flange part 26A is separated from the inner flange part 36A. Namely, the spot weld between the outer flange part 26A and the inner flange part 36A is broken, and the front pillar outer panel 20 is relatively displaced in a direction away from the front pillar inner panel 30.

In contrast, in the front pillar configuration 10 according to the present exemplary embodiment, as illustrated in FIG. 1 and FIG. 5A, the outer bulkhead 28 and the inner bulkhead 38 are provided inside the front pillar 12. Accordingly, rupture of the spot weld between the outer flange part 26A and the inner flange part 36A is suppressed or prevented, and relative displacement of the front pillar outer panel 20 in a direction away from the front pillar inner panel 30 is suppressed. Explanation follows.

Figure 2:
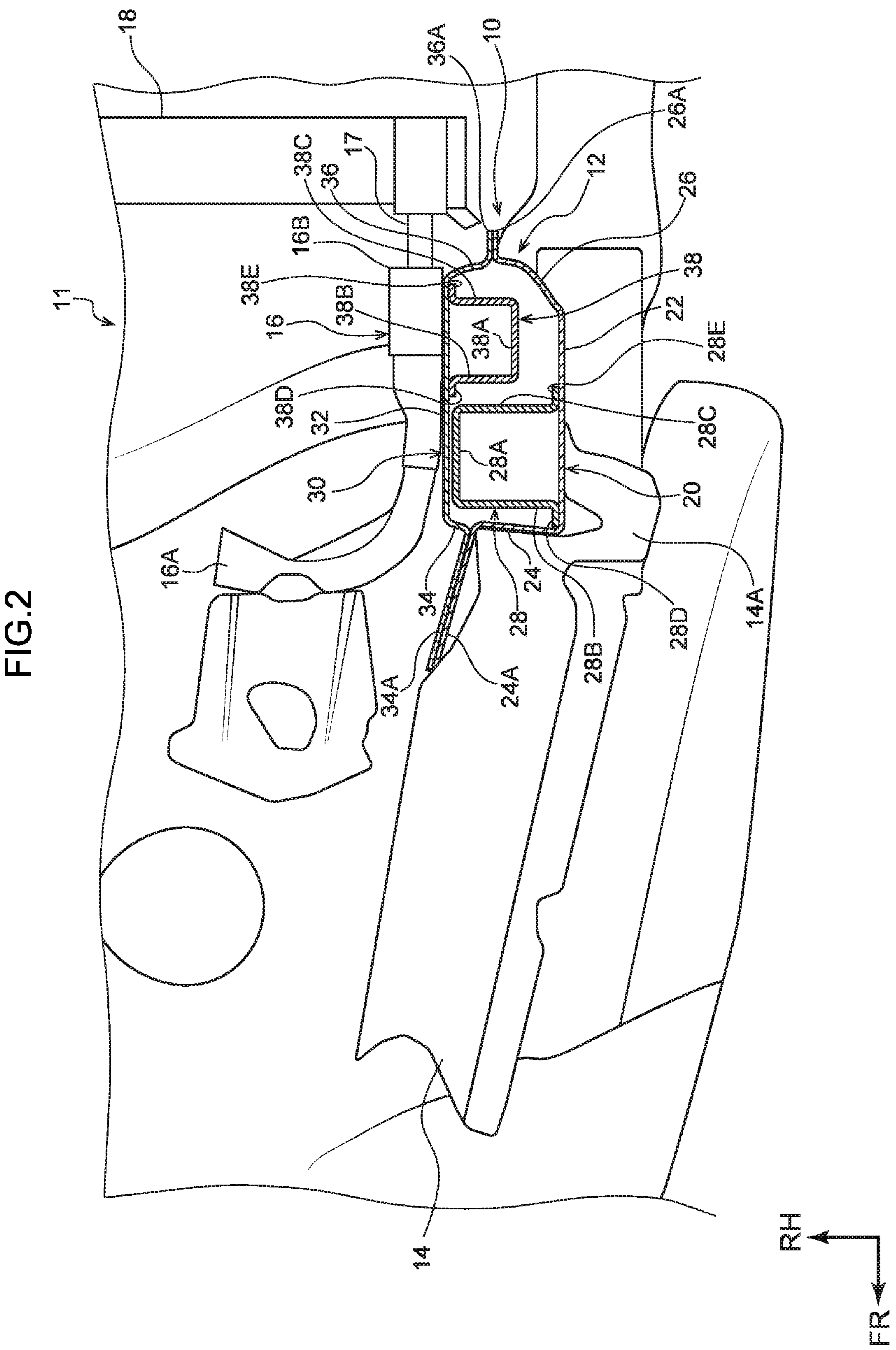
FIG. 2 is a schematic plan view illustrating a state of the front pillar structure according to the present exemplary embodiment at an initial stage of a collision.

When the vehicle 11 including the front pillar structure 10 according to the present exemplary embodiment is involved in a front collision, a collision load is input to the cowl top side panel 14 from the front side. Then, as illustrated in FIG. 2, while the front end of the cowl top side panel 14 is displaced inward in the vehicle width direction and the rear end 14A of the cowl top side panel 14 is displaced rearward and outward in the vehicle width direction, the collision load is transmitted from the cowl top side panel 14 to the front pillar outer panel 20.

Figure 3:
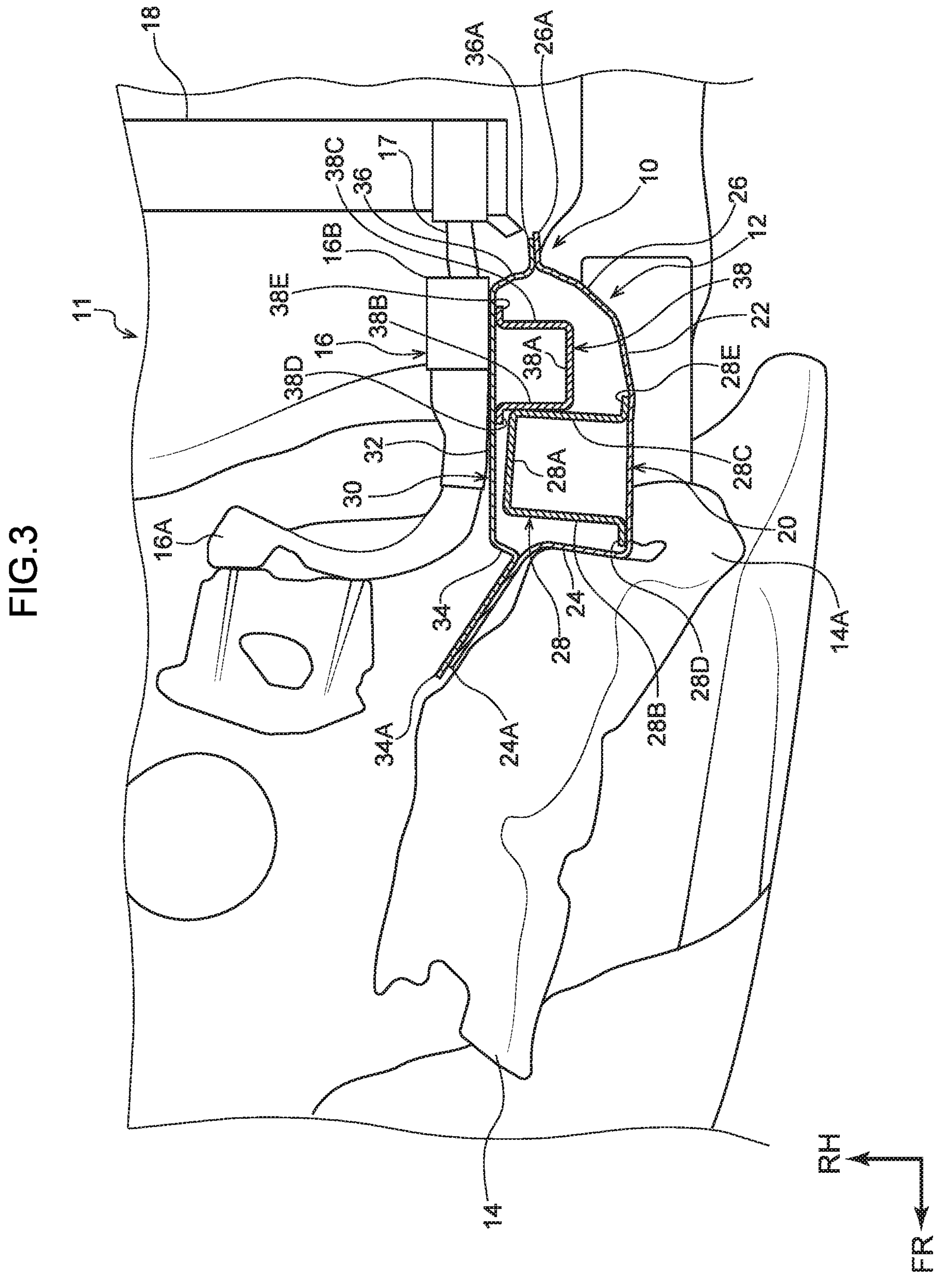
FIG. 3 is a schematic plan view illustrating a mid-collision state of the front pillar structure according to the present exemplary embodiment.

When the collision load is transmitted from the cowl top side panel 14 to the front pillar outer panel 20, the front vertical wall part 24 of the front pillar outer panel 20 is plastically deformed rearward and outward in the vehicle width direction, and the outer wall part 22 of the front pillar outer panel 20 is displaced rearward and outward in the vehicle width direction. As a result, as illustrated in FIG. 3, at least the inner side part of the outer bulkhead 28 in the vehicle width direction joined to the outer wall part 22 is displaced rearward, and the rear wall part 28C then abuts (interferes) with the front wall part 38B of the inner bulkhead 38.

In other words, the collision load transmitted from the front pillar outer panel 20 to the outer bulkhead 28 is transmitted to the inner bulkhead 38, and at least a portion thereof is absorbed by plastic deformation of the outer bulkhead 28 and the inner bulkhead 38. As a result, relative displacement of the outer wall part 22 rearward and outward in the vehicle width direction is suppressed, and the load applied to the rearward outer flange part 26A of the front pillar outer panel 20 in a direction away from the rearward inner flange part 36A of the front pillar inner panel 30 is reduced.

Figure 4:
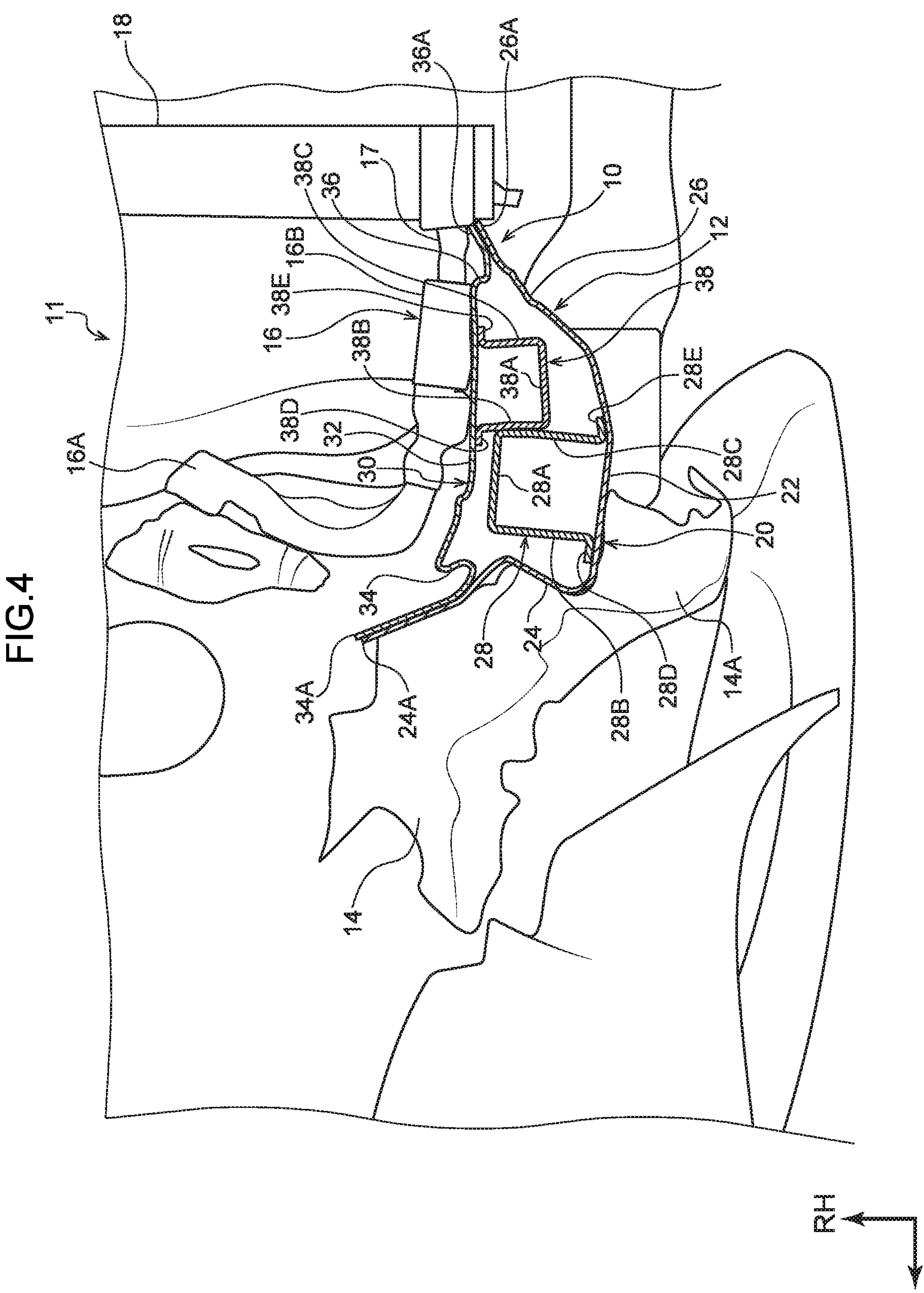
FIG. 4 is a schematic plan view illustrating a state of the front pillar structure according to the present exemplary embodiment at a later stage of a collision.
Figure 5B:
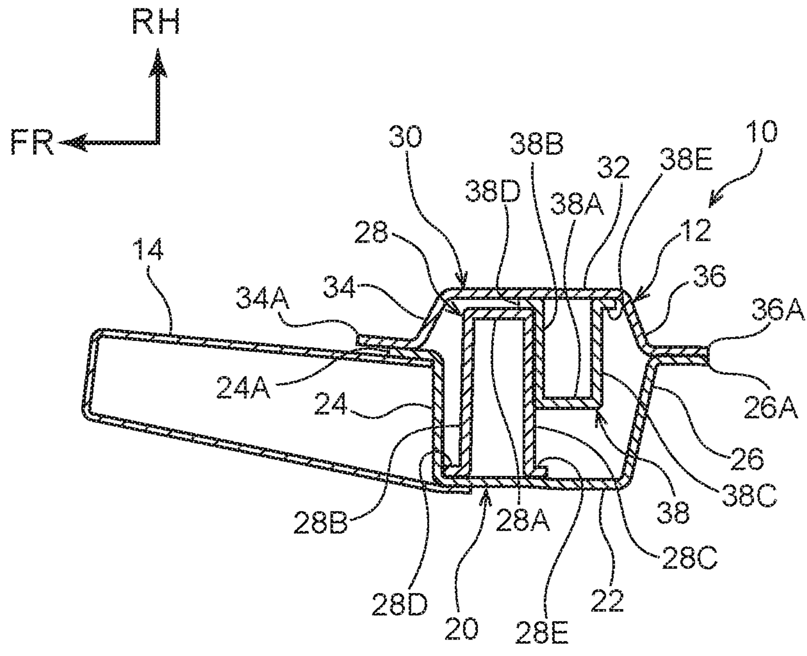
FIG. 5B is a schematic plan view schematically illustrating a state of the front pillar structure according to the present exemplary embodiment at a later stage of a collision.

Namely, as illustrated in FIG. 4 and FIG. 5B, the load applied to the spot-welded part between the outer flange part 26A and the inner flange part 36A is reduced, and rupture (separation) of the spot weld is suppressed or prevented. Thus, the outer flange part 26A is inhibited or prevented from separating from the inner flange part 36A, and relative displacement of the front pillar outer panel 20 in a direction away from the front pillar inner panel 30 is suppressed.

Moreover, the outer bulkhead 28 forms a closed cross-sectional shape in plan view with the outer wall part 22 (front pillar outer panel 20), and the inner bulkhead 38 and the inner wall part 32 (front pillar inner panel 30) form a closed cross-sectional shape in a plan view. Namely, the outer bulkhead 28 and the inner bulkhead 38 are respectively open in the vertical direction.

Accordingly, the outer bulkhead 28 and the inner bulkhead 38, compared to a case in which, for example, a closed cross-sectional shape is configured in a front view seen from the front-rear direction, can easily plastically deform in the front-rear direction, and absorb a collision load. As a result, load input to the spot weld part between the rearward outer flange part 26A and the inner flange part 36A is efficiently reduced, and rupture (separation) of the spot weld is more effectively suppressed or prevented.

Although explanation has been given above regarding the front pillar structure 10 according to the present exemplary embodiment, with reference to the drawings, the front pillar structure 10 according to the present exemplary embodiment is not limited to the illustrated example, and the design may be appropriately modified within a range not departing from the gist of the present disclosure. For example, the outer bulkhead 28 and the inner bulkhead 38 may be disposed so as to configure a closed cross-sectional shape as viewed from the front as long as they are configured so as to be easily plastically deformed in the front-rear direction.

What is claimed is:

1. A front pillar structure, comprising:

a front pillar outer panel formed in a hat-shaped cross section in plan view and having a forward outer flange part, a rearward outer flange part, and an outer wall part that forms an outer side wall of a front pillar, the outer wall part extending in a vertical direction with a vehicle width direction serving as a plate thickness direction thereof;

a front pillar inner panel formed in a hat-shaped cross section in plan view and having a forward inner flange part joined to the forward outer flange part, a rearward inner flange part joined to the rearward outer flange part, and an inner wall part that forms an inner side wall of the front pillar, the inner wall part extending in a vertical direction with the vehicle width direction serving as a plate thickness direction thereof;

an outer bulkhead that extends in the vehicle width direction and is joined to the outer wall part so as to configure a closed cross-sectional shape with the outer wall part, and that is disposed between the outer wall part and the inner wall part in plan view;

an inner bulkhead that extends in the vehicle width direction and is joined to the inner wall part so as to configure a closed cross-sectional shape with the inner wall part, and that is disposed between the outer wall part and the inner wall part in plan view, and at a vehicle rearward side of the outer bulkhead, so as to overlap with the outer bulkhead in the vehicle width direction; and a cowl top side panel disposed at a vehicle forward side of the front pillar outer panel, wherein, in plan view, an interval in the vehicle width direction between the outer bulkhead and the inner wall part is smaller than an interval in the vehicle width direction between the inner bulkhead and the outer wall part.

* * * * *